US005715261A

United States Patent [19]
Schmeltzer et al.

[11] Patent Number: 5,715,261
[45] Date of Patent: Feb. 3, 1998

[54] METHOD OF INTERACTIVE COMMUNICATION NOTABLY FOR HOUSEHOLD APPLICATIONS

[75] Inventors: Christophe Schmeltzer, Metz; Eric Menglier, Aulnois/Seille, both of France

[73] Assignee: I & T Com (societe anonyme), Metz, France

[21] Appl. No.: 251,432

[22] Filed: May 31, 1994

[30] Foreign Application Priority Data

May 28, 1993 [FR] France ................................ 93 06624

[51] Int. Cl.$^6$ ..................... H03M 13/00; G05B 19/408
[52] U.S. Cl. ................. 371/53; 340/825.06; 340/825.07
[58] Field of Search .................... 371/53; 340/825.07, 340/825.06

[56] References Cited

U.S. PATENT DOCUMENTS

| | | | |
|---|---|---|---|
| 4,225,919 | 9/1980 | Kyu et al. | 395/306 |
| 4,912,723 | 3/1990 | Verbanets, Jr. | 375/7 |
| 4,969,147 | 11/1990 | Markkula, Jr. et al. | 370/94.1 |
| 5,001,755 | 3/1991 | Skret | 380/46 |
| 5,218,552 | 6/1993 | Stirk et al. | 364/492 |
| 5,519,878 | 5/1996 | Dolin, Jr. | 395/800 |

OTHER PUBLICATIONS

Pleinevaux, P., et al., "Time Critical Communication Networks: Field Buses", IEEE Network, vol. 2, No. 3, pp. 55–63, May 1988.

Hamabe, R., et al., "A Protocol Example on Super Home Bus System (S–HBS)", IEEE Trans. on Consumer Electronics, vol. 34, No. 3, pp. 686–693, Aug. 1988.

Honda, Y., et al., "Protocol Analyzer for Home Bus System (HBS)", IEEE Trans. on Consumer Electronics, vol. 36, No. 3, pp. 586–592, Aug. 1990.

Markwalter, B. et al., "Design Influences for the CEBus Automation Protocol", IEEE Trans. on Consumer Electronics, vol. 37, No. 2, pp. 145–153, May 1991.

Douligeris, C., "Intelligent Home Systems", IEEE Communications Magazine, pp. 52–61, Oct. 1993.

By R. Hamabe et al., "A Revised New Proposal for Standardization of Home Bus System for Home Automation", IEEE, vol. CE–32, No. 1, Feb. 1986, pp. 1–8.

By J. Birch, "A programmable 800 Mbit/s CRC check/generator unit for LANs and MANs", Computer Networks and ISDN Systems, vol. 24, No. 2, Apr. 1992, pp. 109–118.

*Primary Examiner*—Stephen M. Baker
*Attorney, Agent, or Firm*—Young & Thompson

[57] ABSTRACT

The present invention relates to a method of interactive communication, notably for the household applications. The method consists in realizing, on a coaxial cable, a bi-directional exchange of messages from a single primary station towards secondary stations by an individual addressing or general or limited broadcast, the initiative to transmit being managed by the primary station.

7 Claims, No Drawings

METHOD OF INTERACTIVE COMMUNICATION NOTABLY FOR HOUSEHOLD APPLICATIONS

FIELD OF THE INVENTION

The present invention relates to the field of monitoring, of control and supervision of equipment or domestic networks in the household field and has for object an interactive communication network, notably in household applications.

BACKGROUND OF THE INVENTION

Presently, there are different types of data transmission systems employing existing cabled networks or networks specifically installed for that purpose and which allow the automatic control and monitoring at a distance of certain household functions.

These known systems generally allow one to respond to the exigencies in the matter of monitoring and control, but exhibit a complex structure employing several individual control and monitoring modules managed by a single or several collective control modules, themselves managed by a central module.

SUMMARY OF THE INVENTION

The present invention proposes a simplification of these existing interactive systems and communication methods that they employ.

The object of the invention has, in effect, for object a method of interactive communication, notably in household applications, characterized in that it consists in practice, on a coaxial cable, a bi-directional exchange of messages between a single primary station and secondary stations, by an individual addressing, or by general or limited broadcast, the initiative to transmit being managed by the primary station.

DESCRIPTION OF THE PREFERRED EMBODIMENTS

According to a characteristic of the invention, the exchanged messages between the primary station and the single or plurality of secondary stations are structured in frames of variable length.

Each frame is comprised of at least one "header" comprising a "service" field which determines the type of exchange, a "count" field for the identification of the frames and an "address" field designating the destination station or the transmitting station. The destination station is designated if the frame is sent by the primary station, whereas the transmitting station is designated in the case where the frame is sent by a secondary station.

The "service" and "count" fields are grouped in a byte and the "address" field comprises three bytes.

The bytes comprising the "header" fields, meaning "service", "count" and "address" fields, are protected by a six-bit polynomial field, whose generating polynomial has the following formula:

$$x^6+x^5+x^4+x^3+1$$

and by a "monitor" field, whose value is calculated by an exclusive OR between the byte grouping the "service" and the "count" fields and the three bytes of the "address" field.

According to another characteristic of the invention, a frame may be followed, eventually, by a "data" field to form an information frame. The frame is then completed by a "length" field of one byte protected, on the one hand, by a polynomial of formula:

$$x^6+x^5+x^4+x^3+1$$

and, on the other hand, by an "extension" field of two bits.

The "data" field advantageously comprises between 1 and 255 bytes and is protected by a cyclical redundant 16-bit code, whose generating polynomial has the following formula:

$$x^{16}+x^{12}+x^5+1.$$

The address of a secondary station is comprised of 3 bytes decomposed into 6 nibbles of 4 bits each, each nibble being able to take any value between 00h and 0Eh, the value 0Fh being reserved to broadcast addresses.

The secondary stations verify the frames addressed by the primary station and the finding of an error on the "length" field or in the "data" field brings about a transmission, by the secondary station, of a negative acknowledgment frame, which is integrated in the repeat on error procedure by the primary station.

If an error is detected, either on one of the "count", "service" or "address" fields thanks to the polynomial code, or on the "monitor" field, or on the "length" field, or on the redundant cyclical code protecting the "data" field, a frame is considered to be in error. A frame comprising an error on the "header", meaning on one or several of the "count", "service", "address", or "monitor" fields is ignored.

The primary station manages all of the communications. In this manner, it successively polls each of the secondary stations and detects eventual errors by supervising said secondary stations, which transmit only upon solicitation by the primary station, which is the only station that can take the initiative by an exchange.

The method according to the invention allows two types of addressing, an individual addressing scheme, in view of a transmission towards a single secondary station, and a broadcast addressing scheme by transmitting a same frame towards a group of secondary stations.

In service, the primary station transmits many types of messages, such as demands for information, of control, of inquiry, of broadcasting and of invitation to transmit.

In the first case, the primary station transmits an information frame and receives in return, either an information frame if the secondary station has correctly received the message, or a negative acknowledgment frame or no response if the secondary station has not correctly received the message, the primary station repeating then the attempts to transmit on the basis of a maximum number of attempts.

The response time of a frame is evaluated from T0 milliseconds after the transmission of the last character by the primary station. Following a predetermined T0 parameter, representing the maximum duration, the primary station determines that no response has arrived from the secondary station. In this event the primary station repeats its attempt to transmit. Attempts may be repeated until a parameter N0, representing a maximum of attempts is reached.

In the case of a command, the primary station transmits an information frame. The primary station receives in return, either an acknowledgment frame, if the secondary station has correctly received the frame, or a non-acknowledgment frame or no response, if the station has not correctly received the frame within a delay of T1 milliseconds after the transmission of the last character by the primary station. The transmission of an incorrectly received frame is repeated up to the maximum of N1 attempts in case of negative response.

To carry out an inquiry, the primary station transmits an information frame towards a group of secondary stations and receives in return, either an information frame if a single secondary station signals an event, or garbage data if many secondary stations each signal an event, the primary station then carrying out a procedure to find the secondary stations signaling an event, or no response in the case where no event has been signaled by any station after a predetermined transmission delay of T2 milliseconds. It is considered that no response has arrived if no frame has been received within said delay of T2 milliseconds after the transmission of the last character by the primary station. T2 represents a fixed parameter.

In the case of a broadcast, the primary station transmits N3 identical frames of information at intervals of T3 milliseconds, these frames being designed so as to not engender any response on the part of the secondary stations.

For the procedure of invitation to transmit, the primary station transmits a corresponding frame towards a secondary station and waits for a response, either an acknowledgment frame if the secondary station has no waiting message, or an information frame if such a message is available to the secondary station, or again no response in the case where the frame has not been correctly received by the secondary station within a delay of T6 milliseconds after the transmission of the last character by the primary station, T6 being a predetermined parameter, the primary station then carrying out a maximum of N6 attempts to repeat the transmission, N6 being as well a predetermined parameter.

According to another characteristic of the invention, the "data" field is advantageously comprised of three subfields: a mandatory "type of message" field of one byte, an optional "object" field of one byte and a "parameters" field, if the "object" field is present.

The "type of message" field contains a value indicating at least one of demand for information without parameter, of demands for information with parameter, of command without acknowledgment, of command with acknowledgment, of response to a request for information, of acknowledgment of a command, of broadcast acknowledgment, and of execution and interpretation or of impossible execution.

The purpose of the "objects" field is to contain a value indicating at least one of the following: hour, diagnostic, petition, response to petition, status, message, value, all or nothing, break, resumption, result of a broadcast command and notification of alarm.

The "hour" value is for a message transmitted by the primary station embodied by the "parameters" field containing 6 bytes representing respectively the date, the month, the year, the hour, the minutes and the day.

The "diagnostic" value indicates the "parameters" field, which corresponds to information on the signaled event, in the case of a response sent by a secondary station.

The "petition" value appears in the "objects" field to describe a command to execute by the primary station in the case of a response sent by a secondary station and the "petition response" is for a message transmitted by the primary station, and describes in the "objects" field the response furnished by a secondary station to a petition submitted to the primary station by an other secondary station.

In the case of a response sent by a secondary station, the "parameters" field has a byte which causes the primary station to signal the presence of a "diagnostic" value or a "petition" value or of a "result of an idle command" value.

The "message" value is transmitted in the form of a demand for information by the primary station and allows the primary station to recover a message from a secondary station. This value is also transmitted in the form of a command allowing the primary station to transmit a message towards one or several secondary stations.

The value "message" defined in the "parameters" field, is transmitted by the primary station, either in the form of a demand for information, or in the form of a command, and allows the primary station respectively, either to recover a group of numerical values from a secondary station, or to modify a group of numerical values from a secondary station.

The "all or nothing" value is transmitted by the primary station, either in the form of a demand for information, to recover the state of an entry all or nothing, from a secondary station, or in the form of a command, in view of modifying the state of a group of outputs, all or nothing.

The "break" value, defined by the "parameters" field, is transmitted in the form of a command by the primary station and allows the primary station to signal to a single or several secondary stations the loss of the supervision of a secondary station, which is identified by the "parameters" field. This "parameters" field also identifies the secondary station, whose resumption of supervision has been signalled to one or several secondary stations by the transmission, in the form of a command, of the "resumption" value.

The "result of a broadcast signal" value is transmitted in the form of a demand for information by the primary station and allows the primary station to obtain from a secondary station the result of a command whose execution has been broadcast.

Lastly, the "notification of alarm" value is transmitted in the form of a command by the primary station and allows to signal to one or several secondary stations the appearance of an alarm or of an event on a secondary station.

Thanks to the invention, it is possible to realize an interactive communication, notably for the household applications by employing systems of simple structure and simple methods of operation.

It is understood that the invention is not limited to the embodiments described. Modifications remain possible, notably in the point of view of the implementation of the method, without exceeding the scope of protection of the invention.

What is claimed is:

1. A method of interactive communication for household applications comprising, on a coaxial cable,
   a bidirectional exchange of messages between a single primary station and at least one secondary station, by an individual addressing, general, or limited broadcast, the initiative to transmit being managed by said primary station,
   an address of said secondary station comprising three bytes having 6 nibbles, each nibble having four bits, each nibble being able to take on any value between 00h and 0Eh, the value 0Fh being reserved for broadcast addresses.

2. A method of interactive communication for household applications comprising, on a coaxial cable,
   a bidirectional exchange of messages between a single primary station and at least one secondary station, by an individual addressing, general, or limited broadcast, the initiative to transmit being managed by the primary station, said messages, exchanged between the said primary station and said secondary station, structured in first frames of variable length, each first frame comprising at least one "header" including a "service" field determining the type of message, a "count" field to identify the first frames, and an "address" field designating a destination station or a transmitting station, said "service" and "count" fields grouped in a byte and said "address" field having three bytes, said bytes comprising "header" fields, including said "service," "count," and "address" fields, being protected by a 6-bit polynomial field, whose generating polynomial has the formula:

$$x^6+x^5+x^4+x^3+1,$$

and by a "monitor" field, a value of which is calculated by an exclusive OR of said byte grouping said "service" and "count" fields and said three bytes of said "address" field.

3. A method of interactive communication for household applications comprising, on a coaxial cable,

- a bi-directional exchange of messages between a single primary station and at least one secondary station, by an individual addressing, general, or limited broadcast, the initiative to transmit being managed by said primary station,

- said messages exchanged between said primary station and said secondary station being structured in first frames of variable length,

- one of said first frames transmitted by the said primary station being followed by a "data" field to form a second frame of information,

- said one of said first frame being completed by a "length" field of one byte, protected by a polynomial code of formula $$"x^6+x^5+x^4+x^3+1,$$

and by an "extension" field of two bits.

4. A method of interactive communication for household applications comprising, on a coaxial cable,

- a bi-directional exchange of messages between a single primary station and at least one secondary station, by an individual addressing, general, or limited broadcast, the initiative to transmit being managed by said primary station,

- said messages exchanged between said primary station and said secondary station being structured in first frames of variable length,

- one of said first frames, transmitted by said primary station, being followed by a "data" field to form a second frame of information,

- said "data" field including three subfields: a mandatory "type of message" field of one byte, an optional "objects" field of one byte, and a "parameters" field, if the "object" field is present,

- said "type of message" field defining at least one of the following types: demand for information without parameter, demand for information with parameter, command without acknowledgment, command with acknowledgment, response to a demand for information, acknowledgment of a command, broadcast acknowledgment, execution, and interpretation, and impossible execution.

5. A method of interactive communication for household applications comprising, on a coaxial cable,

- a bi-directional exchange of messages between a single primary station and at least one secondary station, by an individual addressing, general, or limited broadcast, the initiative to transmit being managed by said primary station,

- said messages exchanged between said primary station and said secondary station being structured in first frames of variable length,

- one of said first frames, transmitted by said primary station, being followed by a "data" field to form a second frame of information,

- said "data" field including three subfields: a mandatory "type of message" field of one byte, an optional "objects" field of one byte, and a "parameters" field, if the "object" field is present,

- said "objects" field defining at least one of the following types: hour, diagnostic, petition, petition response, status, message, value, all or nothing, break, resumption, result of broadcast command, and notification of alarm.

6. A method of interactive communication for household applications comprising, on a coaxial cable,

- a bi-directional exchange of messages between a single primary station and at least one secondary station, by an individual addressing, general, or limited broadcast, an initiative to transmit being managed by said primary station,

- said primary station transmitting many types of messages, including demand for information, command, inquiry, broadcast, and invitation to transmit,

- to carry out an inquiry, said primary station transmitting an information frame towards a group of secondary stations and receiving in return an information frame if only one secondary station signals an event, garbage data if several secondary stations each signal an event, said primary station then carrying out a procedure to find said secondary station signalling an event, or no presuming response when no event is signalled by any secondary station after a transmission delay of T2 milliseconds.

7. A method of interactive communication for household applications comprising, on a coaxial cable,

- a bi-directional exchange of messages between a single primary station and at least one secondary station, by an individual addressing, general, or limited broadcast, an initiative to transmit being managed by said primary station,

- said primary station transmitting many types of messages including demand for information, command, inquiry, broadcast, and invitation to transmit,

- in the case of a broadcast message, said primary station transmitting N3 identical frames in succession at intervals of T3 milliseconds, said identical frames being designed not to elicit any response from said secondary stations.

* * * * *